US010489773B2

(12) United States Patent
Gilbey et al.

(10) Patent No.: US 10,489,773 B2
(45) Date of Patent: Nov. 26, 2019

(54) METHOD FOR PASSIVELY CLOSING A PRE-AUTHORIZED TAB WITH AN ASSOCIATED PAYMENT TOKEN

(71) Applicant: MasterCard Asia/Pacific Pte Ltd, Singapore (SG)

(72) Inventors: Benjamin Charles Gilbey, Singapore (SG); Vijin Venugopalan, Singapore (SG)

(73) Assignee: MASTERCARD ASIA/PACIFIC PTE. LTD, Singapore (SG)

( * ) Notice: Subject to any disclaimer, the term of this patent is extended or adjusted under 35 U.S.C. 154(b) by 489 days.

(21) Appl. No.: 15/262,198

(22) Filed: Sep. 12, 2016

(65) Prior Publication Data

US 2017/0083902 A1    Mar. 23, 2017

(30) Foreign Application Priority Data

Sep. 17, 2015    (SG) ............................ 10201507758Q (51) Int. Cl.
*G06Q 20/10* (2012.01)
*G06Q 20/32* (2012.01)
*G06Q 20/34* (2012.01)
*G06Q 20/40* (2012.01)

(52) U.S. Cl.
CPC ............. *G06Q 20/34* (2013.01); *G06Q 20/40* (2013.01)

(58) Field of Classification Search
CPC .............................. G06Q 20/10; G06Q 20/32
USPC .......................................................... 705/39
See application file for complete search history.

(56) References Cited

U.S. PATENT DOCUMENTS

2015/0134518 A1*   5/2015   Turovsky ............... G06Q 20/12
                                                                705/41

* cited by examiner

*Primary Examiner* — Hai Tran
(74) *Attorney, Agent, or Firm* — Buckley, Maschoff & Talwalkar, LLC (57) ABSTRACT

A merchant system for passively closing a patron's pre-authorized tab, with an associated payment token, set up with a computer device in communication with the merchant system, said system including one or more processors in communication with data storage, said processors being configured to execute computer readable instructions stored on said data storage for performing the steps of (a) determining if the pre-authorized tab should be passively closed; (b) if the pre-authorized tab should be passively closed, then performing the steps of (i) generating a total amount spent on goods and/or service ordered by the patron; (ii) sending the total amount spent and the payment token associated with the pre-authorized tab to an online service for authentication so as to pay the merchant; and (iii) closing the pre-authorized tab.

16 Claims, 9 Drawing Sheets

METHOD FOR PASSIVELY CLOSING A PRE-AUTHORIZED TAB WITH AN ASSOCIATED PAYMENT TOKEN

CROSS REFERENCE TO RELATED APPLICATION

This application is a U.S. National Stage filing under 35 U.S.C. § 119, based on and claiming benefit of and priority to SG 10201507758Q filed Sep. 17, 2015.

FIELD OF THE INVENTION

The present invention relates to a method for passively closing a pre-authorized tab with an associated payment token.

BACKGROUND OF INVENTION

Some businesses are structured to sell good or services in multiple batches to patrons over a relatively short period of time. For example, a patron of a bar or night club may purchase multiple rounds of drinks of the course of an evening. Typically, the transaction associated with the purchase of each round of drinks will involve the following steps:
  (a) the patron queuing up at the bar, waiting to catch the bartender's attention;
  (b) placing an order for desired drinks;
  (c) receiving the drinks;
  (d) checking that drinks presented match what was ordered; and
  (e) making payment by cash, credit card or by any other acceptable means.

The step of making the payment is an essential part of the process. However, it is often a time consuming and generally inconvenient part of this time honoured tradition. This is especially the case where:
  (a) the patron stays at the bar for an extended period of time purchasing multiple rounds of drinks;
  (b) the bar is busy and there are numerous patrons all jockeying for position to get service; and/or
  (c) credit card payments are made for each transaction.

With regard to the latter point, a great deal of time and inconvenience can be spent processing a credit card payment by both the merchant's employee and the patron.

As a consequence of the above described difficulties, added pressure is placed on the merchant's staff who are attempting to service the patrons. This may lead to job dissatisfaction and higher turnover in staff. It may also lead to patron dissatisfaction and, in the long term, less patrons returning to the bar.

Many systems and processes have been devised to assist merchants to provide patrons with more efficient payment options. For example, rather than paying for each round of drinks individually, some bars will allow patrons to set up an account (hereafter referred to as a "tab") which will be used to record the details of each one of the patron's orders.

This system relies on the patron making payment at the end of the night before leaving the bar. Typically, before the customer leaves the bar, he or she needs to:
  (a) ask the merchant to total up the items on the tab and to produce an invoice;
  (b) review the itemised list of goods purchased on the invoice and confirm that it is accurate; and
  (c) effect payment by cash, credit card, or any other means which is acceptable to the merchant.

Using a tab in the above described manner can make the process of purchasing goods more efficient which has benefits for both the patron and the merchant's staff. However, difficulties can arise where:
  (a) the patron leaves the bar without first paying the tab; or
  (b) the patron discovers that he or she cannot make payment of the tab due to lack of cash, credit or any other suitable means of payment.

To reduce the likelihood of such difficulties arising, some bars request you to secure the tab by the patron giving the merchant his or her credit card to hold whilst the tab is open. This provides increased security for the merchant. However, often bars do not request preauthorisation of a tab limit on the credit card and, as such, the merchant cannot be certain that:
  (a) there is sufficient credit on the card to cover the tab when the patron leaves the bar; and/or
  (b) the credit card is not stolen.

In addition to the above-described difficulties, the practice of keeping credit cards as security for tabs is changing around the world. For example, in some jurisdictions, the laws now require the merchant to take steps to ensure that the cards are securely stored whilst the tab is open. In some cases, there are even requirements to store the cards in the merchant's safe during this period. Plainly, meeting such requirements can be time consuming and can place an extra burden on the merchant and/or his or her staff.

Further difficulties can arise for the patron where, at the end of his or her night, it is generally inconvenient to retrieve the credit card from the bar and close off the tab. This may be due to the queue at the bar being too lengthy which is particularly problematic at the end of a long night out. Alternatively, difficulties can arise where a credit card is accidently left at the bar due to intoxication, fatigue and/or absentmindedness. In this case, the patron needs to return to the bar to close off the tab and retrieve his or her credit card. In the meantime, the patron is relying on the merchant to not use the card in an unauthorised manner and to ensure that the card is securely stored until it is collected.

Although the above mentioned difficulties are described by way of example to a bar, the difficulties are relevant to many other businesses where a patron effects multiple purchases of goods or services over short period of time. For example, ordering food and drinks at a restaurant or a café, or purchasing tickets for rides at a carnival.

Many methods of conducting secure electronic commerce transactions are known in the art. U.S. Pat. No. 7,058,611 describes in some detail a method involving the SET™ protocol which facilitates secure payment card transactions over the Internet. The disclosure of U.S. Pat. No. 7,058,611 in its entirety is hereby incorporated by way of reference.

Using the SET protocol, cryptography is utilized to ensure confidential and secure transmissions of data and digital certificates to create a trust chain throughout the transaction, verifying cardholder and merchant validity. There have been numerous extensions and additions to the SET specification, all of which are presently available on SETCo's website, setco.org. The SET protocol ("SET") is typically invoked after a consumer has completed the payment and other information on an order form and is ready to return the order form to the merchant.

SET changes the way that participants in a payment system interact. In a face-to-face retail transaction or a mail order transaction, electronic processing begins with the merchant or the acquirer. However, in a SET transaction, the electronic processing begins with the cardholder.

In the electronic commerce environment, consumers and corporate purchasers generally interact with merchants from personal computers. A cardholder (or account holder—a physical card is not necessary) uses a payment account number or card that has been issued by an issuer. SET ensures that the cardholder's interactions with the merchant, and specifically the payment card account information, remains confidential. The typical participants, entities or components (in addition to the account holder) involved in a SET transaction are the issuer, the merchant, the acquirer and payment gateway, each of which can be described as follows:

1. An issuer is a financial institution that establishes an account for a cardholder and most often issues the payment card. The issuer guarantees payment for authorized transactions using the payment card in accordance with payment card brand regulations and local legislation.
2. A merchant offers goods for sale or provides services in exchange for payment. With SET, the merchant can offer its cardholders secure electronic interactions. A merchant that accepts payment cards must have a relationship with an acquirer, which is the financial institution that establishes an account with a merchant and processes payment card authorizations and payments.
3. A payment gateway is a device operated by an acquirer or a designated third party that processes merchant payment messages, including payment instructions from cardholders.

As mentioned above, SET is an Internet transaction protocol which provides security through authentication. It enforces a series of checks and counterchecks between the participants' computers to ensure details are processed correctly, safely and securely. In this way, SET creates a trust framework around the electronic commerce transaction process, ensuring confidentiality, data integrity and authentication of each party.

As described, SET uses encryption technology and digital certificates as the basis for electronic commerce transactions. There are several components required for SET to work:

1. Digital Certificates;
2. Certificate Authorities;
3. Cardholder Wallet and Encryption;
4. Merchant SET Software Requirements; and
5. Payment Gateways.

To become SET-compliant, merchants simply need to integrate a SET software component into their virtual storefront system. This SET software then facilitates the actual authorization and settlement process of the payment transaction. The SET module is software developed from the SET specifications.

The SET Transaction Process

Once a consumer has selected items for purchase from an Internet retailer's website and has been presented with an order form, the SET transaction process begins as follows:

1. The cardholder (or account holder) selects the 'Payment with SET' option and then chooses their form of payment e.g. Visa, MasterCard etc.
2. The merchant 'wakes up' the cardholder's SET wallet, which sends a message to the merchant indicating which payment card the consumer is using.
3. An exchange takes place between the merchant and cardholder, authenticating each party and encrypting the payment information. This encrypted data is then forwarded to the merchant, which sends it, still encrypted, to the SET payment gateway.
4. The SET payment gateway authenticates all the parties in the transaction and forwards the authorization request into the payment network and processes the transaction with its normal authorization process.
5. If approved, the merchant ships the requested goods or provides the requested service and, in return, receives payment from its financial institution.

More recently, the 3-D Secure protocol has gained prominence as a way of adding a security layer to online e-commerce transactions. Two implementations of 3-D Secure are known as Verified by Visa and MasterCard SecureCode.

Verified by Visa Acquirer and Merchant Implementation Guide (http://usa.visa.com/download/merchants/verified-by-visa-acquirer-merchant-implementation-guide.pdf) describes a 3D secure online program designed to make Internet purchase transactions safer by authenticating a cardholder's identity at the time of purchase, before the merchant submits an authorization request. This document, in its entirety, is hereby incorporated into this specification for all purposes by way of reference.

MasterCard Secure Code (https://www.mastercard.us/content/dam/mccom/en-us/documents/SMI_Manual.pdf) describes another 3D secure online program. This document, in its entirety, is hereby incorporated into this specification for all purposes by way of reference.

U.S. patent application Ser. No. 13/209,312 (Wong) generally discloses a phone-based electronic wallet that provides transactions across multiple channels of commerce. The electronic wallet described therein can be used for point of sale payments, remote mobile payments and/or web based payments. The disclosure of U.S. patent application Ser. No. 13/209,312 in its entirety is hereby incorporated into this specification by way of reference.

Figure 1:
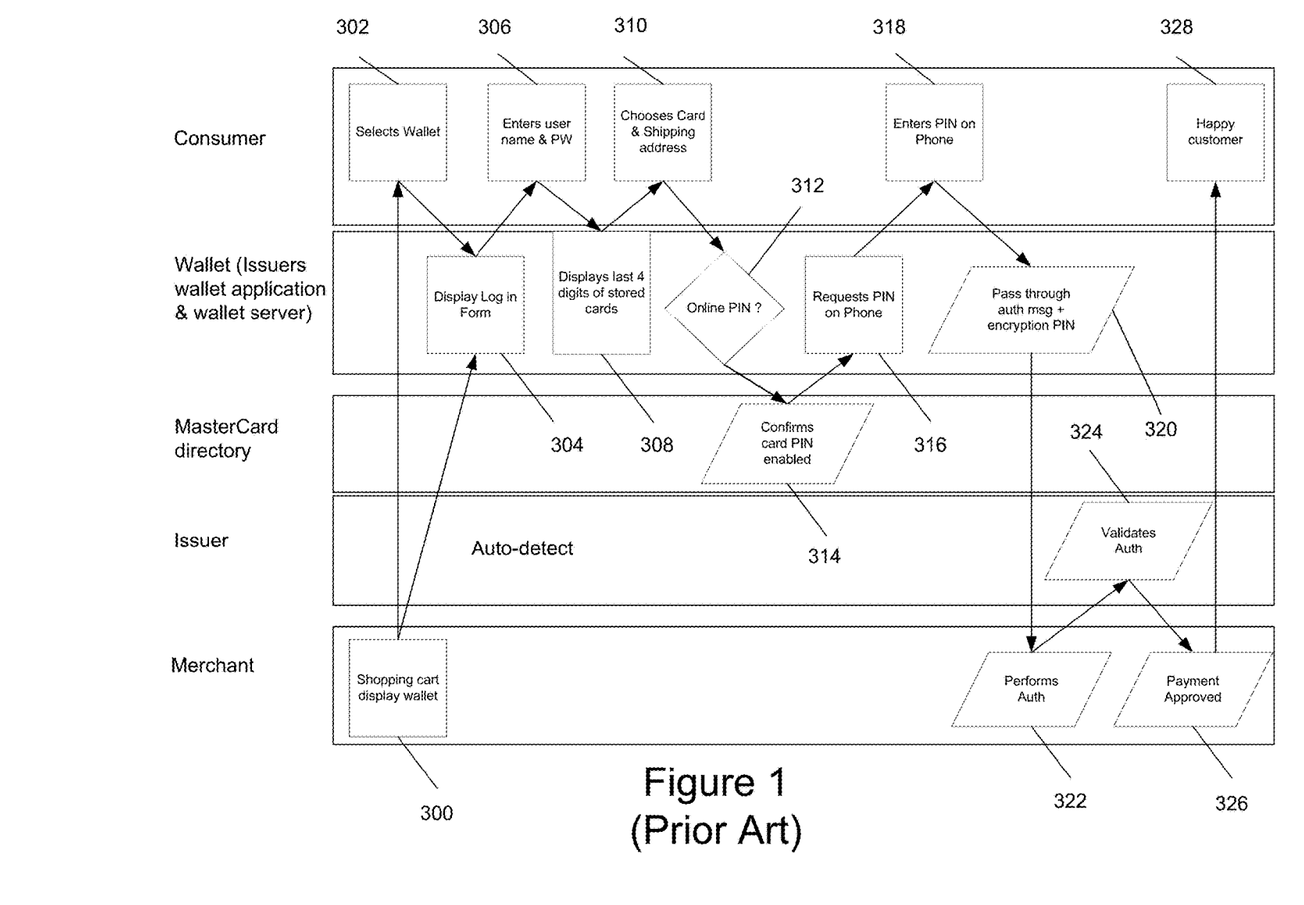
FIG. 1 is a flow chart depicting a prior art wallet application being used in an e-commerce transaction with an online PIN.

FIG. 1 is a flow chart depicting the wallet application being used in an e-commerce transaction (e.g., a phone-initiated transaction) with an online PIN. Paragraph 39 of Wong provides the following summary of with reference to that Figure:

In step 300, the consumer selects the "wallet" icon on the merchant's site. The consumer then selects the wallet application (step 302), which then displays a log in form (step 304). Alternatively, the wallet may be autodetected. The consumer logs in at step 306, views the listed cards at step 308, and thereafter selects the appropriate payment card and shipping details (step 310). At step 312, the wallet questions whether an online PIN is associated with the card. The existence of the online PIN is confirmed at step 314. In step 316, the wallet requests entry of the online PIN into the phone. The online PIN is entered at step 318. Thereafter, the online PIN is encrypted (step 320), and forwarded to the merchant for authorization (step 322). The transaction is validated at step 324, payment is approved at step 326, resulting in a happy consumer (step 328).

U.S. patent application Ser. No. 13/835,088 (Nwokolo) generally discloses a system of tokenizing sensitive cardholder payment information for use in cashless transactions. The disclosure of U.S. patent application Ser. No. 13/835,088 in its entirety is hereby incorporated into this specification by way of reference. Tokenization is also described in detail in the document "EMV Payment Tokenisation Specification—Technical Framework" (version 1.0, March 2014) of EMV Co., which is hereby incorporated into this specification for all purposes by reference. The EMV Payment Tokenisation Specification is available at www.emvco.com.

Nwokolo identifies that electronic wallets are becoming a more prevalent counterpart to electronic forms of payment for a wide variety of transactions. Nwokolo puts forward that the system above described in Wong, together with the system being the subject of U.S. patent application Ser. No. 13/746,904 entitled "System and method to enable a network of digital wallets", includes a federated network of electronic wallets. The purchaser may select this network of wallets which includes partners who are members of the federation, each of whom provide electronic wallet services. One option presented to the purchaser may be the option to use an electronic wallet maintained and provided by the payment processing entity, e.g., MasterCard International Incorporated (assignee of the instant application), which is also operating the network of wallets.

Given the overwhelming volume of transactions consummated per second, and the necessity that transactions be authorized expeditiously in order to be an acceptable form of payment for all parties involved in the transaction, the circumstances naturally lend themselves to automation of the approval process. However, without adequate oversight on an individual or per-transaction basis, and/or without the parties to the transaction being known to others involved, including the intermediary, the opportunity for malicious abuse of the payment system require adequate safeguards.

A problem presented is where the transaction details required to consummate a purchaser's transaction may be used thereafter for malicious purposes, for example if the security of such data is compromised by a third party, or by another bad actor with access to cardholder data used during the transaction.

Figure 2:
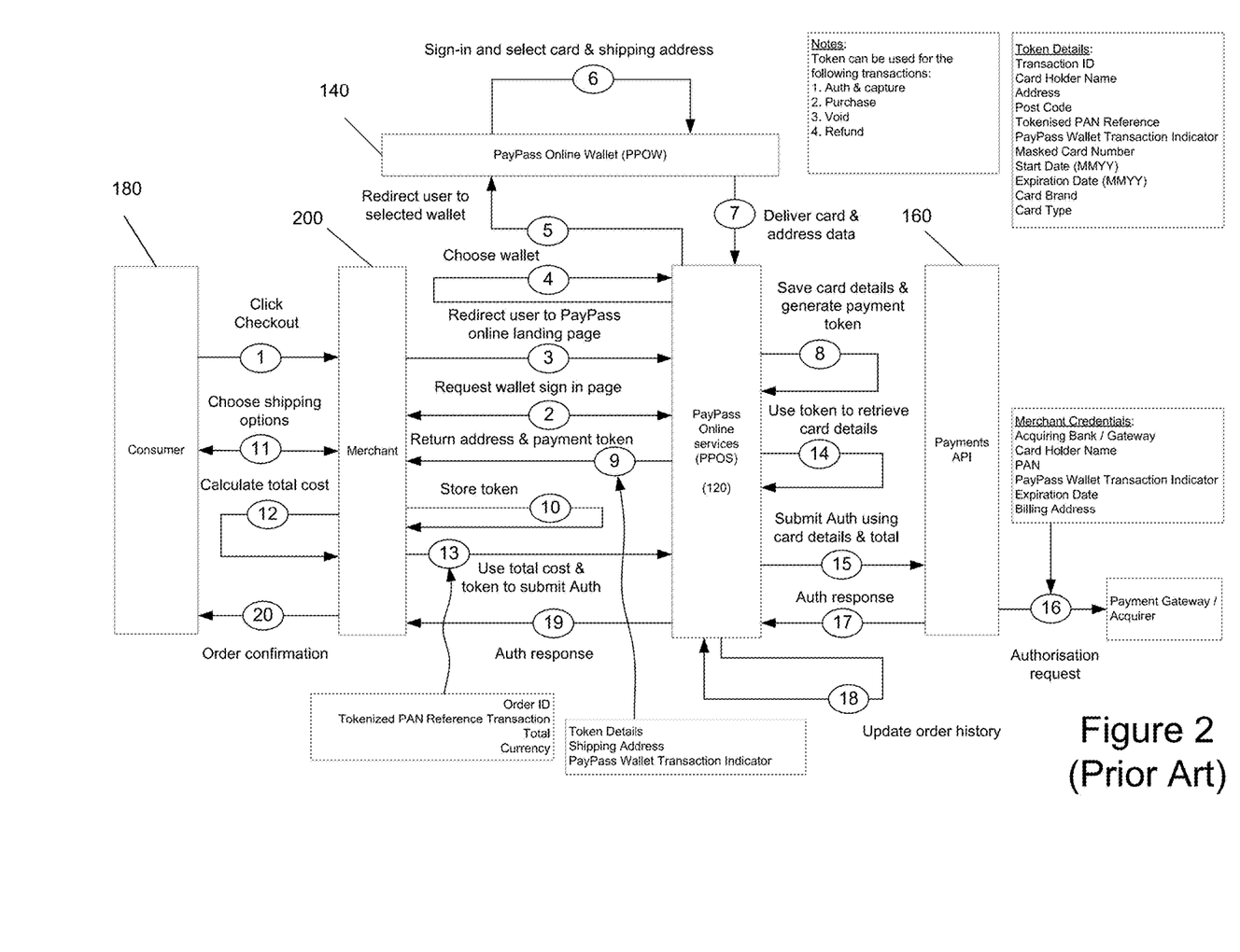
FIG. 2 is a schematic representation of a prior art payment/authentication system.

As a solution to this problem, Nwokolo provides the system shown in FIG. 2 which generally performs the steps of:
(a) receiving a request to process a cashless transaction between a merchant and a purchaser using first payment data stored with an electronic wallet provider on behalf of the purchaser.
(b) receiving first payment data from the electronic wallet provider;
(c) tokenizing the first payment data into a payment token; and
(d) providing the payment token to the merchant for use in completing the cashless transaction.

The merchant issues a request to process payment for the cashless transaction using the payment token. The payment token is detokenized into second payment data, with correspondence between the first and second payment data being indicative of payment token authenticity. Payment for the cashless transaction is processed using the second payment data, and the merchant is provided with a response indicating either the success or failure of the payment processing.

It is generally desirable to improve patron experiences with making payments for goods and services. It is also generally desirable to improve merchant and/or merchant employee experiences with making payments.

It is generally desirable to overcome or ameliorate one or more of the above described difficulties, or to at least provide a useful alternative.

SUMMARY OF INVENTION

In accordance with the invention, there is provided a merchant system for passively closing a patron's pre-authorized tab, with an associated payment token, set up with a computer device in communication with the merchant system, said system including one or more processors in communication with data storage, said processors being configured to execute computer readable instructions stored on said data storage for performing the steps of:
(a) determining if the pre-authorized tab should be passively closed;
(b) if the pre-authorized tab should be passively closed, then performing the steps of:
(i) generating a total amount spent on goods and/or service ordered by the patron;
(ii) sending the total amount spent and the payment token associated with the pre-authorized tab to an online service for authentication so as to pay the merchant; and
(iii) closing the pre-authorized tab.

Preferably, the step of determining if the pre-authorized tab should be passively closed includes the step of determining if the patron's computer device is within a virtual perimeter associated with the merchant system.

Preferably, the step of determining if the pre-authorized tab should be passively closed is effected by testing whether the patron's computer device is still in communication with the merchant system.

Preferably, the step of determining if the patron's computer device is within a virtual perimeter is effected by performing the steps of:
(a) sending a request for location data to the patron's device;
(b) receiving data representing the location of the patron's device from the patron's device; and
(c) determining whether the location of the patron's device is located within said virtual perimeter.

In accordance with the invention, there is also provided a non-transitory computer readable storage medium embodying thereon a program of computer readable instructions which, when executed by one or more processors of a patron's portable computer device in communication with a merchant system, cause the device to perform a method for passively closing a pre-authorized tab with an associated payment token, including the steps of:
(a) determining if the pre-authorized tab should be passively closed;
(b) if the pre-authorized tab should be passively closed, then performing the steps of:
(i) generating a total amount spent on goods and/or service ordered by the patron;
(ii) sending the total amount spent and the payment token associated with the pre-authorized tab to an online service for authentication so as to pay the merchant; and
(iii) closing the pre-authorized tab.

Preferably, the step of determining if the pre-authorized tab should be passively closed includes the step of determining if the patron's computer device is within a virtual perimeter associated with the merchant system.

Preferably, the step of determining if the pre-authorized tab should be passively closed is effected by testing whether the patron's computer device is still in communication with the merchant system.

Preferably, the step of determining if the patron's computer device is within a virtual perimeter is effected by performing the steps of:
(a) generating data representing a location of the patron's device; and
(b) determining whether the location of the patron's device is within said virtual perimeter.

In accordance with the invention, there is also provided a merchant system for facilitating a pre-authorized tab for purchasing goods and/or services, said system including one or more processors in communication with data storage, said processors being configured to execute computer readable instructions stored on said data storage for performing the steps of:
  (a) receiving a request from a patron's computer device to create a pre-authorized tab, said request including a device identifier;
  (b) receiving data representing an upper limit for the pre-authorized tab from the patron's device;
  (c) directing the patron's device to a landing page where the user can sign into an online wallet and select a suitable payment source;
  (d) receiving a payment token from an online service engaged by said online wallet;
  (e) generating and storing a user tab token including:
    (i) a unique merchant identifier;
    (ii) a device identifier; and
    (iii) the payment token;
  (f) sending a request for pre-authorization to the online service, the request including the payment token and the data representing the upper limit for the tab;
  (g) receiving from the online service approval for the requested pre-authorization;
  (h) determining if the pre-authorized tab should be passively closed; and
  (i) if the pre-authorized tab should be closed then, performing the steps of:
    (i) generating a total amount spent on goods and/or services ordered by the patron;
    (ii) sending the total amount spent and the payment token to the online service for authentication; and
    (iii) closing the pre-authorized tab.

Preferably, the step of determining if the pre-authorized tab should be closed involves the step of determining if the patron's device is within a virtual perimeter.

Preferably, the step of determining if the pre-authorized tab should be closed is effected by testing whether the patron's device is in communication with the merchant's system.

Preferably, the step of determining if the user device is within a virtual perimeter is effected by performing the steps of:
  (a) sending a request for location data to the patron's device;
  (b) receiving data representing the location of the patron's device from the patron's device; and
  (c) determining whether the location of the patron's device is located within said virtual perimeter.

In accordance with the invention, there is provided a non-transitory computer readable storage medium embodying thereon a program of computer readable instructions which, when executed by one or more processors of a patron's portable computer device in communication with a merchant system, cause the device to perform a method for facilitating a pre-authorized tab for purchasing goods and/or services, including the steps of:
  (a) receiving a request from a patron's computer device to create a pre-authorized tab, said request including a device identifier;
  (b) receiving data representing an upper limit for the pre-authorized tab;
  (c) generating a display including a landing page where the user can sign into an online wallet and select a suitable payment source;
  (d) receiving a payment token from an online service engaged by said online wallet;
  (e) generating and storing a user tab token including:
    (i) a unique merchant identifier;
    (ii) a device identifier; and
    (iii) the payment token;
  (f) sending a request for pre-authorization to the online service, the request including the payment token and the data representing the upper limit for the tab;
  (g) receiving from the online service approval for the requested pre-authorization;
  (h) determining if the pre-authorized tab should be passively closed; and
  (i) if the pre-authorized tab should be closed, then performing the steps of:
    (i) generating a total amount spent on goods and/or services ordered by the patron;
    (ii) sending the total amount spent and the payment token to the online service for authentication; and
    (iii) closing the pre-authorized tab.

Preferably, the step of determining if the pre-authorized tab should be passively closed includes the step of determining if the patron's computer device is within a virtual perimeter associated with the merchant system.

Preferably, the step of determining if the pre-authorized tab should be passively closed is effected by testing whether the patron's computer device is still in communication with the merchant system.

Preferably, the step of determining if the patron's computer device is within a virtual perimeter is effected by performing the steps of:
  (a) generating data representing a location of the patron's device; and
  (b) determining whether the location of the patron's device is within said virtual perimeter.

BRIEF DESCRIPTION OF THE DRAWINGS

Preferred embodiments of the invention are hereafter described, by way of non-limiting example only, with reference to the accompanying drawings, in which.

DETAILED DESCRIPTION OF PREFERRED EMBODIMENTS OF THE INVENTION

Figure 3:
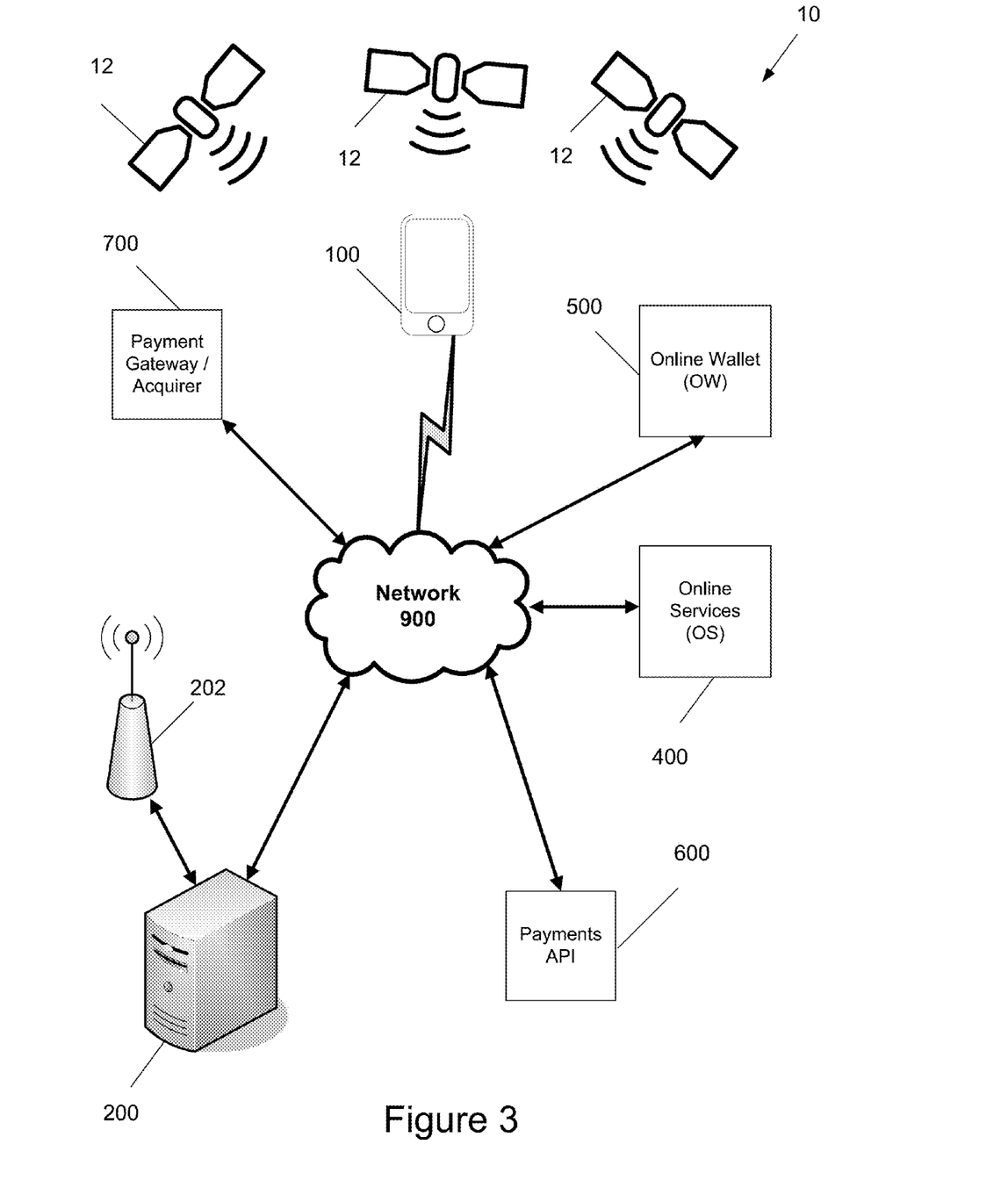
FIG. 3 is a schematic diagram of a system for establishing a pre-authorized tab and later facilitating passive closure of the tab.

The system 10 shown in FIG. 3 allows a person to use his or her portable computer device 100 to set up a pre-authorised tab for purchasing a merchant's goods and/or services. The pre-authorised tab remains open whilst one or more of the following conditions are met:

(a) the patron's device is physically located in, or proximal to, a merchant's premises;
(b) the current time is within the licensed trading hours of the merchant's venue; and
(c) the current time is within a time limit defined by the patron when establishing the pre-authorised tab.

The system 10 ameliorates one or more of the difficulties of the prior art by:
(a) allowing the merchant to have a pre-authorised transaction which ensures that the merchant will get paid regardless of the customer's activity/behavior;
(b) reducing the risk that the credit card being used is stolen;
(c) removing the burden of securely storing a credit card whilst a tab is open;
(d) ensuring that the pre-authorised tab gets closed without the patron needing to physically engage the merchant to do so.

Figure 4A:
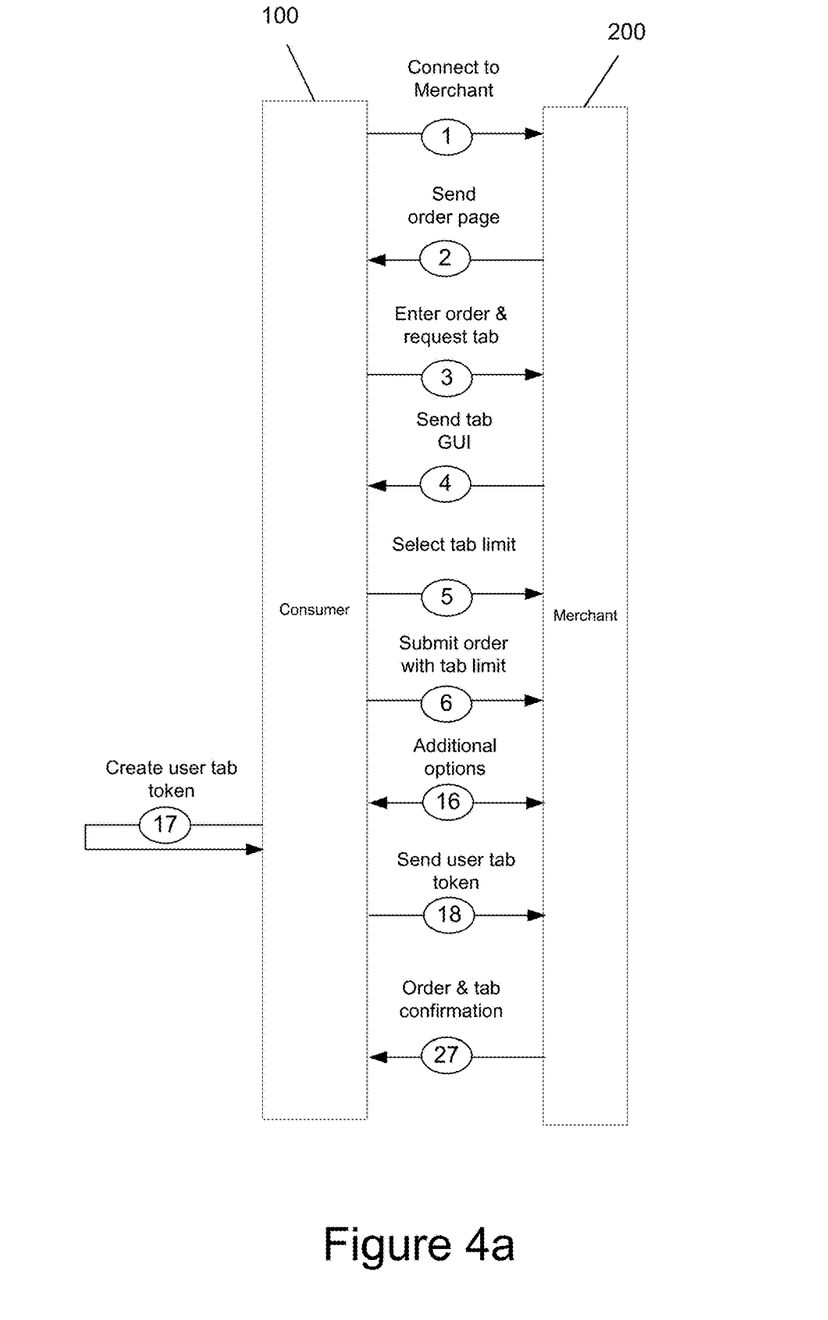
FIGS. 4a and 4b are schematic representations showing interactions between components of the system shown in FIG. 3.
Figure 4B:
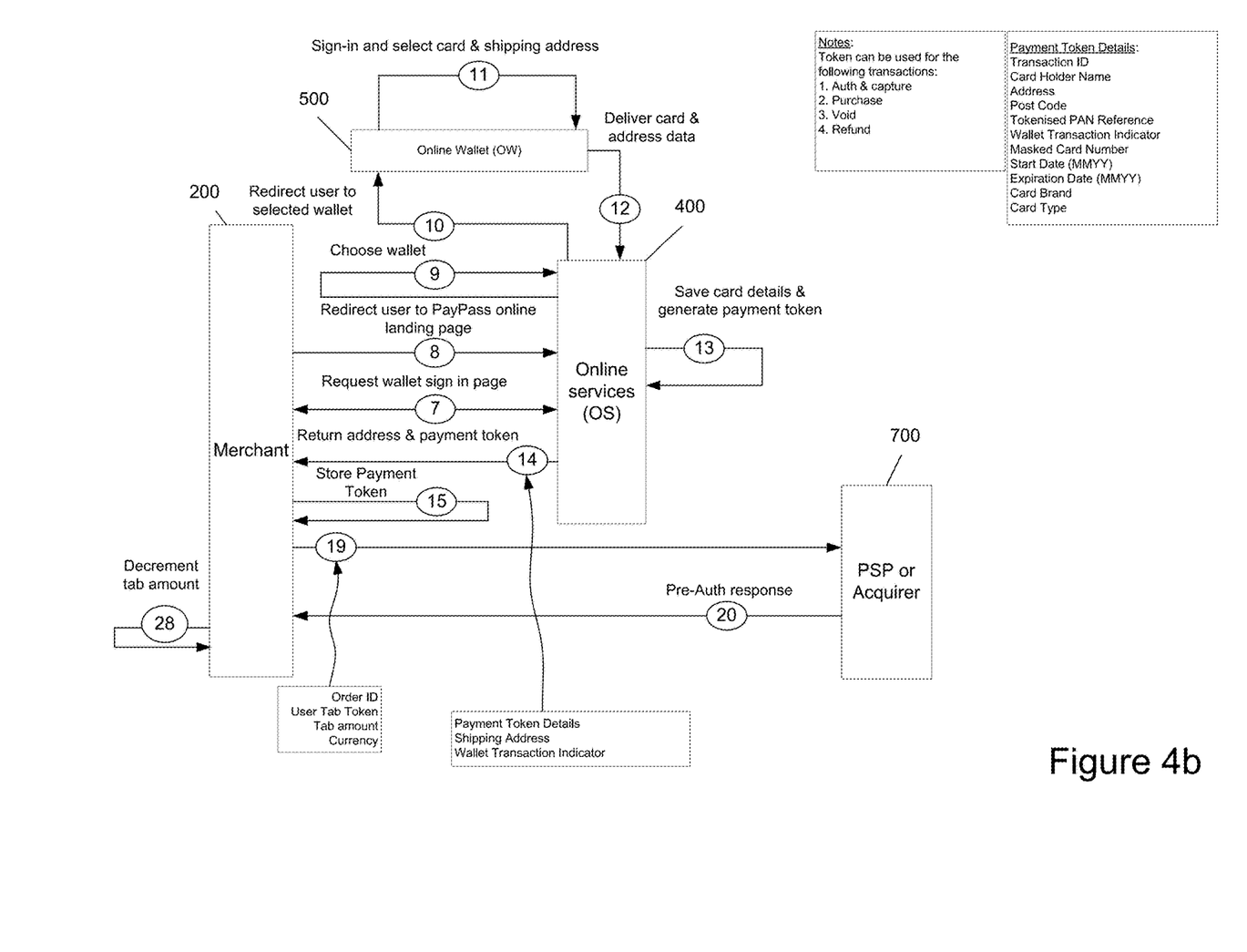

FIGS. 4a and 4b provide a schematic representation of a payment/pre-authentication system and method. Illustrated is a sequence of operations for the tokenization of payment transaction data within the context of a federated network of wallets.

At the point illustrated in FIG. 4a, it is assumed that a customer with a mobile computer device 100, such as a smart phone, has entered the premises of a merchant and is set to interface with the merchant's computer system 200. The system 10 is below described by way of reference to the patron using a web browser on his or her device 100 to access pages published by the merchant system 200. Alternatively, the patron can install a merchant software application onto the device 100. The software application will present pages analogous to those described below that are published by the merchant system 200.

At step 1, the patron's device 100 connects to the merchant's wireless network 202 using standard communications protocols. For example, the wireless network 202 is a Bluetooth Low Energy (BLE) network or a Wifi connection specific to the merchant.

Figure 5A:
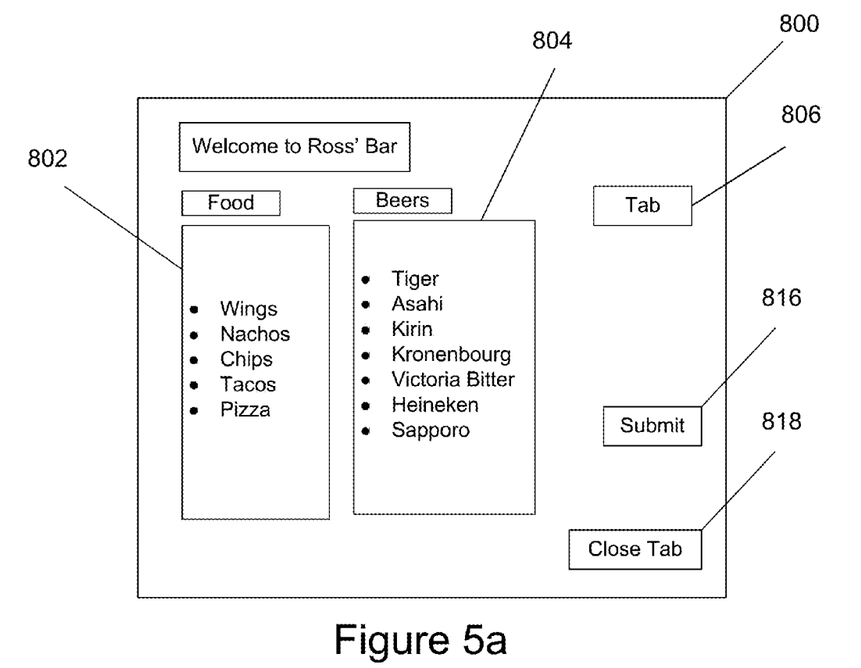
FIGS. 5a and 5b are graphical user interfaces generated by the system shown in FIG. 3.

Once a connection has been established, at step 2, the merchant's system 200 sends the order page 800 shown in FIG. 5a to the patron's device 100.

On receipt of this page, the device 100 presents the page to the user so that he or she can create an order. The patron is invited to do so by selecting, at step 3, one or more of the food 802 and/or drink 804 items presented. This process is known in the art and is not described here in further detail.

The patron is also given the opportunity to create a tab by electing the "Tab" function button 806. On selection of this button 806 the merchant system 200 sends, at step 4, the patron's device 100 the tab graphical user interface (GUI) 808 show in FIG. 5b. The tab GUI 808 includes a device 810 with which an upper limit for the tab can be entered. The amount can range from $0 to the available credit limit on the user's credit card which will be approved using the processes described later below. Alternatively, the tab GUI 808 can receive user input to define the tab limit using any suitable means.

Figure 5B:
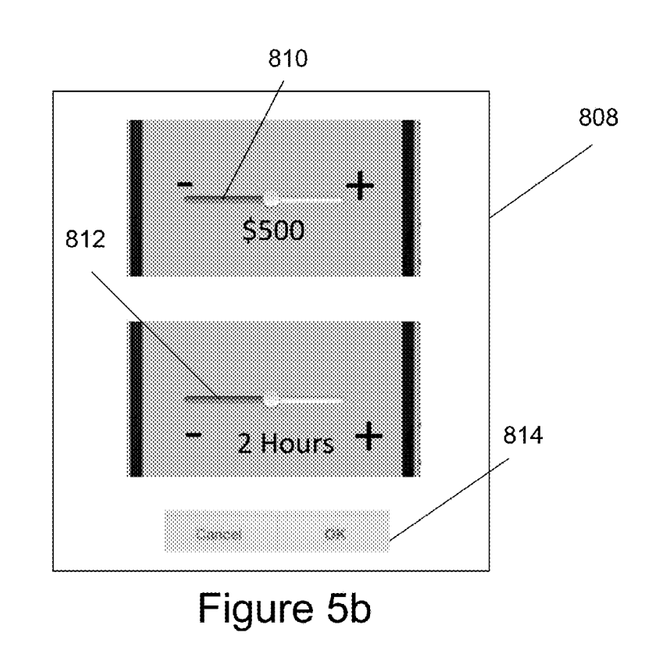

The tab GUI 808 also includes a time device include a device 812 with which the user can define a fixed period of time that the tab will remain open. The amount can range from 0 to the time remaining to the closing time of the merchant. Alternatively, this can be done by either specifying an end time by which the tab will be cut off.

Once the user has entered the tab limit using the device 810, he or she executes the "Ok" function button 814, at step 5, and the user is returned to the order page 800.

Although the system 10 has been above described with reference to a bar providing goods, the system 10 is applicable to any merchant selling any combination of goods and/or services.

At this point, the consumer has selected the group of goods and/or services to be involved in the transaction with merchant system 200. This process is typically embodied, for example, in an online e-commerce transaction or in a merchant application executing on the consumer's device 100. As such, the consumer's device 100 has placed certain goods or services in an electronic shopping cart. When the patron executes, at step 6, the "Submit" function button 816 the wallet service 400 is invoked.

With reference to FIG. 4b, at step 7, the merchant application, or a browser being served pages by the merchant system 200, communicates the wallet sign-in request to wallet service 400. In some embodiments, the merchant system 200 then redirects the user to a network of wallets landing page, step 8. The user is given the opportunity to choose an electronic wallet from among those available, including the opportunity to create a new wallet. The wallets may include one operated by wallet provider 500 apart from their capacity as the network of wallets operator. Alternatively, the Online Wallet (also referred to as an "electronic wallet" or a "digital wallet") may be a MasterPass wallet. The purchaser chooses their wallet in step 9, and wallet service 400 redirects the user to their selected wallet in step 10. In other embodiments, only a single wallet option may be presented to the user, for example a wallet operated by the wallet provider 500. In one example the single wallet option is MasterPass of MasterCard International Incorporated.

The consumer signs into their selected wallet in step 11. They also select from among the payment sources, for example card accounts, associated with their selected wallet. The purchaser may further select a table number or location in the merchant's premises. The online wallet provider/PPOW 500 delivers selected card and address data to the operator of the network of wallets, OS 400, in step 12.

Wallet service 400 then saves the selected card details and uses the card details to generate a payment token which will be shared with the merchant in order to consummate the transaction in step 13. The card details delivered from OW 500 preferably includes a primary account number (PAN). The generation of a payment token step 13 preferably includes the payment token as a programming object or file. The token generally includes:
(a) a transaction identifier;
(b) a cardholder name;
(c) billing address;
(d) postal code;
(e) a tokenized PAN reference in substitution for the PAN;
(f) a wallet transaction indicator;
(g) a masked card number representing the selected card from the wallet;
(h) a start date associated with the selected card;
(i) an expiration date associated with the card; and
(j) the card brand and/or type.

At step 14, wallet service 400 returns a return address and the payment token together to the merchant application or web browser of customer device 100, which transmits them to the merchant system 200 in order to finalize the transaction.

In certain embodiments, the tokenized card reference may include a virtual card number (VCN). The virtual card number in substitution for the PAN may provide additional security features. For example, the VCN may be limited to one or a fixed number of uses. A one-time use VCN would being applicable for an isolated transaction. A VCN enabled for repeated use would allow the merchant system 200 to use of the same payment token and/or VCN. One such example where this might be beneficial is with recurring fixed transactions or variable transactions within a predetermined amount range. This is typically useful for the present purposes where a tab is being established. Moreover, at this point in the transaction where the token is generated, the full final amount of the tab is not yet be known.

Capping the dollar amount of associated with the payment token consistent with the legitimate completion of the transaction for which it is generated provides an additional layer of security. In addition to capping a dollar amount on the payment token, the payment token may be bound to the merchant involved in initiating the corresponding transaction for which it is generated. That is to say, the particular payment token would not be honoured if presented by some other merchant for authentication. In this way, should the payment token be compromised or intercepted by a malicious third party or other bad actor, the payment token would not be useful with any other merchant.

Having received the payment token in step 14, the merchant 200 stores the token as step 15, then presents the consumer system 200 with any final options (for example table location) to complete the transaction, that being step 16.

In addition, a User Tab Token is created on the device 100, at step 17, which includes the following unique identifiers:
 (a) unique merchant identifier (not MID);
 (b) device ID (IMEI, UDID etc);
 (c) GPS location of user device;
 (d) merchant opening hours;
 (e) tab close off time; and
 (f) tokenized payment card details.

The User Tab Token is sent to Merchant system 200, at step 18, along with the amount set by the customer as their tab (say $200). The payment card details and User Tab Token amount are sent by the merchant system 200 to a payment service provider (PSP) or to the merchant's acquirer 700, at step 19, for pre-authorization to ensure that the card is in good-standing. The data sent at step 19 preferably includes:
 (a) an order ID reference;
 (b) the user token generated at step 17;
 (c) a total tab amount; and
 (d) a currency of the transaction.

The authorization request sent by the merchant system 200 preferably includes:
 (a) merchant credentials;
 (b) the name of the acquiring bank/payment service provider;
 (c) cardholder name;
 (d) PAN;
 (e) wallet transaction indicator;
 (f) expiration date of the applicable card; and
 (g) billing address associated with the account upon which the card is drawn.

Presuming the pre-authorization response is affirmative, the merchant system 200:
 (a) confirms the order to the consumer device 100, step 20; and
 (b) the order amount ($x) is decremented from the pre-authorized tab amount ($200) step 28.

The customer is able to continue to use his or her device 100 to request orders to the pre-authorized tab amount.

Next Order Exceeds Tab

If the pre-authorized tab amount will be exceeded by the proposed new order, then the software application running on the user's device 100:
 (i) notifies the user of that the order will exceed the tab;
 (ii) give the user an option to manually close the tab or to extend the tab.

If the user elects to extend the tab, then the above-described processes are again performed for the new pre-authorized tab amount. The user in his conscious sense sets the next maximum amount that he would spend on Food/Drinks. This is called the Risk Parameter.

Otherwise, the user can manually or passively close the tab.

Closing the Tab

The customer has at least the following options for closing the tab:
 (1) Manually closing out the existing pre-authorized tab; and
 (2) Passively closing the tab.

(1) Manually Close Tab

To manually close the tab, on execution of the "Close Tab" function button 818, the page 800 is presented on the user device 100. The merchant system 200 totals the value of the purchased items (the Final Amount). The server 200 sends the Final Amount for authorization to the PSP or acquirer. The pre-authorization is cancelled and the actual authorization is done for the Final Amount.

(2) Passively Closing the Tab

If the patron has not manually closed his or her tab in the above-described manner, then the tab can be passively closed by any one of the following events:
 (a) the user device 100 moves outside a geo-fenced area;
 (b) the merchant's opening hours have been exceeded; and/or
 (c) a time limit for the tab has expired.

In each case, the User Tab Token is released for post-authorization and the merchant is paid.

The above-described token release activators are designed to ensure that the merchant receives payment in full without a possibly inebriated customer needing to act, and also provides merchant protection against non-paying customers.

(a) User Device 100 Moves Outside of Geo-Fenced Area

Figure 6:
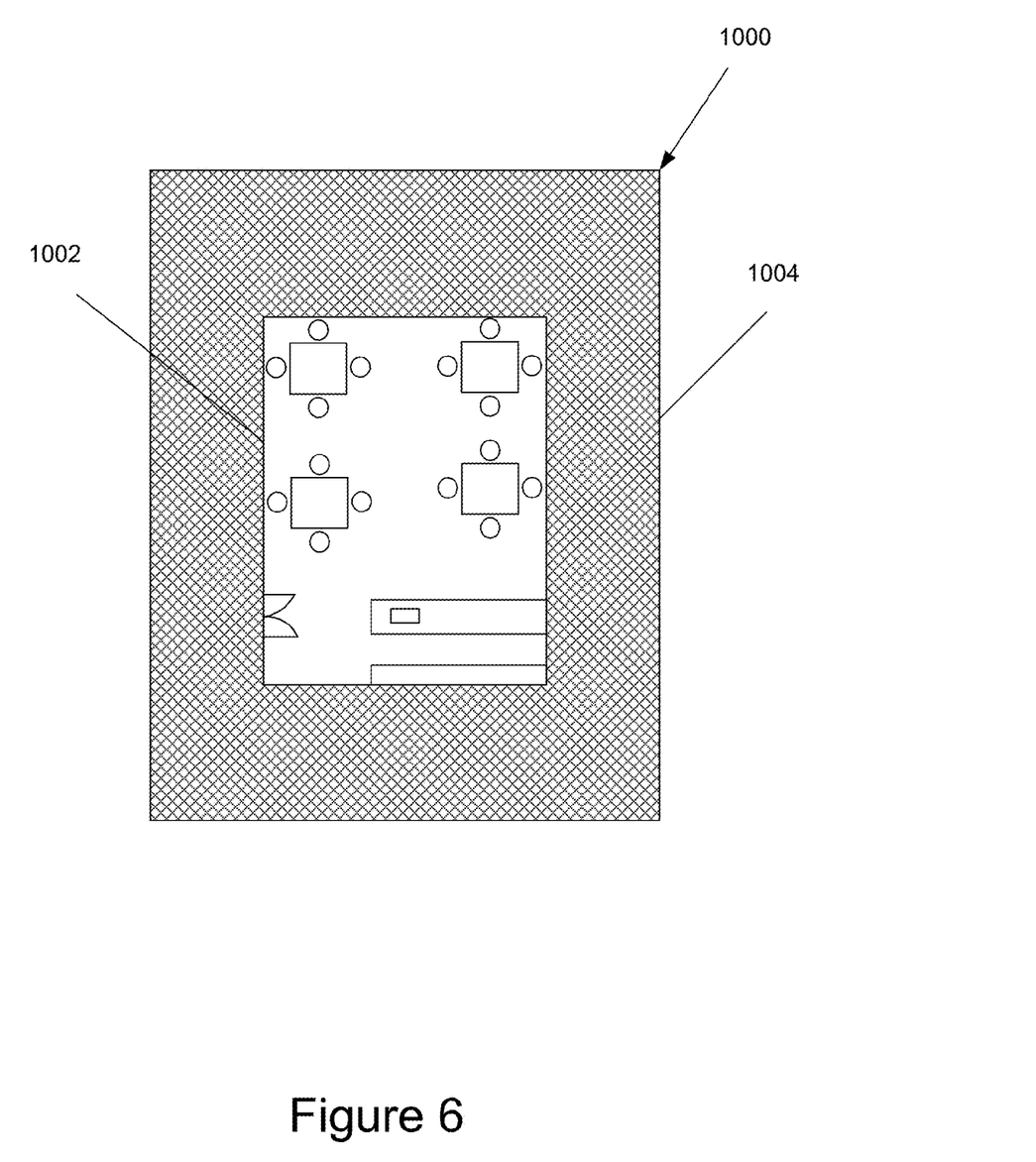
FIG. 6 is a diagrammatic illustration of a merchant premises and associated geo-fenced area.

As shown in FIG. 6, the merchant's premises 1000 is defined by the physical area of the building 1002 and the greater area, within which the physical building resides, defined by a virtual perimeter 1004. The virtual perimeter 1004 (the Geo-Fence) is defined by one or more of the following:
 (i) an area 1004 serviced a merchant's wireless network
 (ii) dynamically generated radius 1004 around the store 1002; and/or
 (iii) a set of points that define a perimeter of the Geo-Fenced area 1004.

Alternatively, the Geo-Fenced area 1004 can be define by any other suitable means.

As above-described, when the customer enters the merchant's premises 1002 and uses his or her device 100 to set up a pre-authorized tab, the device's unique device ID is recorded by the merchant system 200. At this time, the device 100 is within the Geo-Fenced area and is in communication with the merchant system 200 by a wireless network 900.

The merchant's system 200 performs the following routine for each device 100 connected via the network 900 that has an active or open pre-authorized tab:
 (1) check to see if the device 100 is within Geo-Fenced area 1004;

(a) if not, check if the customer has closed his or her tab manually; and
  (i) if not, the system 200 performs the steps of:
    (a) sending a notification to the user device 100 confirming that he or she has left the premises 1000 and that the tab will now be closed; and
    (b) closing the tab for the amount spent by the user by performing the above-described steps.

To determine if a device 100 is within the Geo-Fenced area 1004, the merchant system 200 continuously polls the device 100 over the wireless network 900. Whilst the connective is active, the system 200 can confirm that the device 100 is still in the Geo-Fenced area 1004.

To determine if a device 100 is within the Geo-Fenced area 1004, the merchant system 200 also preferably continuously polls each device 100 that has an associated pre-authorized tab requesting location information. The merchant system 200 performs a routine to determine whether each location received is within the Geo-Fenced area 1004. Each device 100 includes location services for determining device location. For example, each device includes a GPS receiver and associated software to determine its location based on information from GPS satellites 12. Alternatively, the device 100 can determine it location by reference to mobile towers that it is connected to. These processes are known in the art and are not described here in further detail.

Alternatively, where the user has downloaded a copy of the merchant's application software onto his or her device 100, the application software performs the following routine:
  (i) check to see if the device 100 is within Geo-Fenced area 1004;
  (ii) if not, then check to see if the customer has closed his or her tab manually; and
  (iii) if not, then perform the steps of:
    (a) display a notification on the device 100 confirming that he or she has left the premises 1000 and that the tab will now be closed;
    (b) generate a total the bill for the total amount spent by the user;
    (c) send notification to the merchant system 200 to close the tab for the amount spent.

On receipt of the notification mentioned in step (c), the merchant system 200 closes the tab by the user by performing the above-described steps.

(b) Merchant's Opening Hours Exceeded

The merchant's system 200 also preferably performs the following routine for each device 100 connected via the network 900 that has an active or open pre-authorized tab:
  (1) Check if current time is within the merchant's defined opening hours;
    (a) if not, check if the customer has closed his or her tab manually; and
      (i) if not, the system 200 performs the steps of:
        (a) sending a notification to the user device 100 confirming that the merchant is closed and that the tab will now be closed; and
        (b) closing the tab for the amount spent by the user by performing the above-described steps Alternatively, where the user has downloaded a copy of the merchant's application software onto his or her device 100, the application software running on the user device 100 performs the following routine:
  (1) Check if current time is within the merchant's defined opening hours;
    (a) if not, check if the customer has closed his or her tab manually; and
      (i) if not, then perform the steps of:
        (a) displaying a notification to the user device 100 confirming that the merchant is closed and that the tab will now be closed;
        (b) generate a total the bill for the total amount spent by the user; and
        (c) send notification to the merchant system 200 to close the tab for the amount spent.

On receipt of the notification mentioned in step (c), the merchant system 200 closes the tab by the user by performing the above-described steps.

(c) Time Limit for the Tab Expired

As above mentioned, it is possible for the user to use the time device 812 in the tab GUI 808 to define a fixed period of time that the tab will remain open. If this has been set, then the system 10 automatically closes off the tab when the time has expired.

The merchant's system 200 performs the following routine for each device 100 connected via the network 900 that has an active or open pre-authorized tab with a time limit:
  (1) Check if current time is within the time period specified by the user;
    (a) if not, check if the customer has closed his or her tab manually; and
      (i) if not, the system 200 performs the steps of:
        (a) sending a notification to the user device 100 confirming that the specified time has finished and that the tab will now be closed; and
        (b) closing the tab for the amount spent by the user by performing the above-described steps Alternatively, where the user has downloaded a copy of the merchant's application software onto his or her device 100, the application software running on the user device 100 performs the following routine:
  (1) Check if current time is within the time period specified by the user;
    (a) if not, check if the customer has closed his or her tab manually; and
      (i) if not, then perform the steps of:
        (a) displaying a notification to the user device 100 confirming that the specified time period has closed ended and that the tab will now be closed;
        (b) generate a total the bill for the total amount spent by the user; and
        (c) send notification to the merchant system 200 to close the tab for the amount spent.

On receipt of the notification mentioned in step (c), the merchant system 200 closes the tab by the user by performing the above-described steps.

The system 10 has been described by way of reference to the merchant system 200 interfacing with Online Service 400 configured in a specific manner. However, it is envisage that the merchant system 200 could interface with any one of a number of different systems that are configured to set up a pre-authorized tab. For example, in an alternative embodiment, the OS 400 can outsource the tokenization and gateway authorization. In this embodiment a third party tokenizer and/or payment gateway entity can perform these functions. Such systems are known in the art and are not described here in further detail.

The Mobile Device 100

Figure 7:
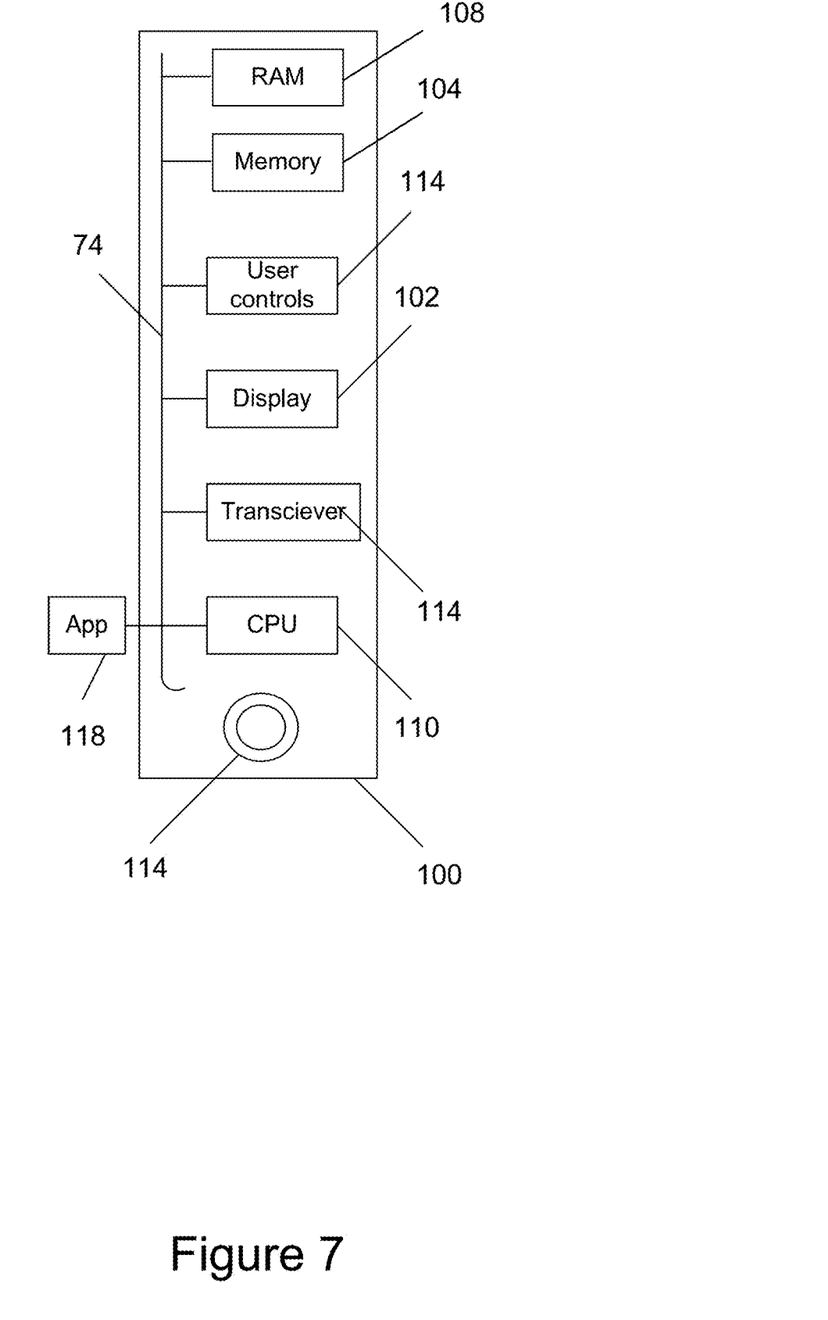
FIG. 7 is a schematic diagram showing components of a user device of the system shown in FIG. 3.

The mobile device 100 is a handheld computer device such as a smart phones or a PDA such as one manufactured by Apple™, LG', HTC', Research In Motion™, or Motorola™. The mobile device 100 includes a mobile computer such as a tablet computer. An exemplary embodiment of the mobile device 100 is shown in FIG. 7. As shown, the device 100 includes the following components in electronic communication via a bus 106:
1. a display 102;
2. non-volatile memory 104;
3. random access memory ("RAM") 108;
4. N processing components 110;
5. a transceiver component 112 that includes N transceivers; and
6. user controls 114.

Figure 8:
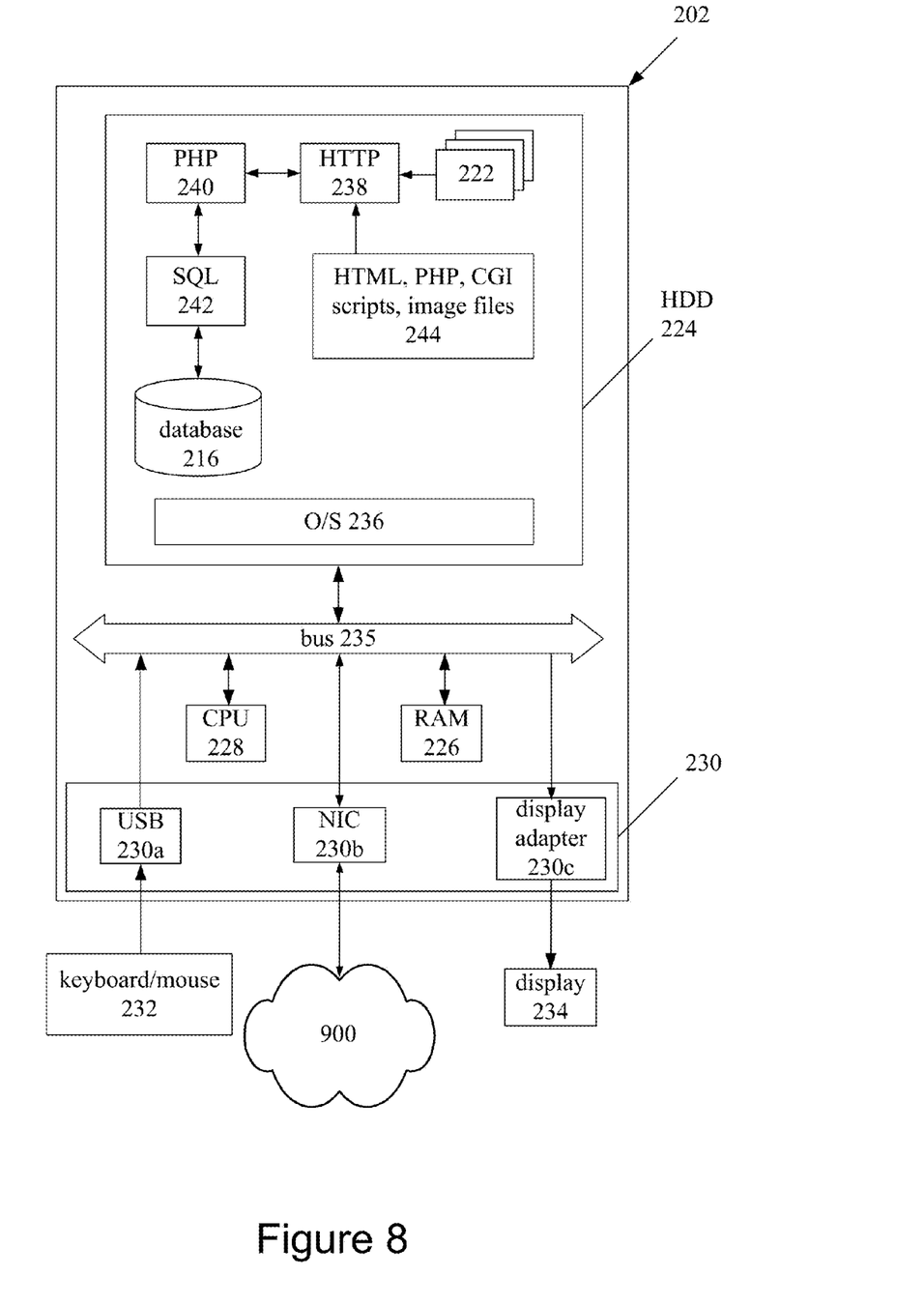
FIG. 8 is a schematic diagram showing components of a merchant system of the system shown in FIG. 3.

Although the components depicted in FIG. 8 represent physical components, FIG. 8 is not intended to be a hardware diagram; thus many of the components depicted in FIG. 8 may be realized by common constructs or distributed among additional physical components. Moreover, it is certainly contemplated that other existing and yet-to-be developed physical components and architectures may be utilized to implement the functional components described with reference to FIG. 8.

The display 102 generally operates to provide a presentation of content to a user, and may be realized by any of a variety of displays (e.g., CRT, LCD, HDMI, micro-projector and OLED displays). And in general, the non-volatile memory 104 functions to store (e.g., persistently store) data and executable code including code that is associated with the functional components of a browser component and the Merchant App 118. In some embodiments, for example, the non-volatile memory 104 includes bootloader code, modem software, operating system code, file system code, and code to facilitate the implementation of one or more portions of the Merchant App 118 as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Merchant System 200

The system 200 is provided by a server 202 in communication with a database 216, as shown in FIG. 8. The computer system 202 is able to communicate with user equipment 100 over a communications network 900 using standard communication protocols.

The components of the system 200 can be configured in a variety of ways. The components can be implemented entirely by software to be executed on standard computer server hardware, which may comprise one hardware unit or different computer hardware units distributed over various locations, some of which may require the communications network 900 for communication. A number of the components or parts thereof may also be implemented by application specific integrated circuits (ASICs) or field programmable gate arrays.

In the example shown in FIG. 9, the computer system 202 is a commercially available server computer system based on a 32 bit or a 64 bit Intel architecture, and the processes and/or methods executed or performed by the computer system 202 are implemented in the form of programming instructions of one or more software components or modules 222 stored on non-volatile (e.g., hard disk) computer-readable storage 224 associated with the computer system 202. At least parts of the software modules 222 could alternatively be implemented as one or more dedicated hardware components, such as application-specific integrated circuits (ASICs) and/or field programmable gate arrays (FPGAs).

The computer system 202 includes at least one or more of the following standard, commercially available, computer components, all interconnected by a bus 235:
1. random access memory (RAM) 226;
2. at least one computer processor 228, and
3. external computer interfaces 230:
   a. universal serial bus (USB) interfaces 230*a* (at least one of which is connected to one or more user-interface devices, such as a keyboard, a pointing device (e.g., a mouse 232 or touchpad),
   b. a network interface connector (NIC) 230*b* which connects the computer system 202 to a data communications network, such as the Internet 900; and
   c. a display adapter 230*c*, which is connected to a display device 234 such as a liquid-crystal display (LCD) panel device.

The computer system 202 includes a plurality of standard software modules, including:
1. an operating system (OS) 236 (e.g., Linux or Microsoft Windows);
2. web server software 238 (e.g., Apache, available at http://www.apache.org);
3. scripting language modules 240 (e.g., personal home page or PHP, available at http://www.php.net, or Microsoft ASP); and
4. structured query language (SQL) modules 242 (e.g., MySQL, available from http://www.mysql.com), which allow data to be stored in and retrieved/accessed from an SQL database 216.

Together, the web server 238, scripting language 240, and SQL modules 242 provide the computer system 202 with the general ability to allow users of the Internet 900 with standard computing devices 100 equipped with standard web browser software to access the computer system 202 and in particular to provide data to and receive data from the database 216. It will be understood by those skilled in the art that the specific functionality provided by the system 202 to such users is provided by scripts accessible by the web server 238, including the one or more software modules 222 implementing the processes performed by the computer system 202, and also any other scripts and supporting data 244, including markup language (e.g., HTML, XML) scripts, PHP (or ASP), and/or CGI scripts, image files, style sheets, and the like.

The boundaries between the modules and components in the software modules 222 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field—programmable gate array (FPGA), the design of a gate array or full-custom application-specific integrated circuit (ASIC), or the like.

Each of the blocks of the flow diagrams of the processes of the computer system 202 may be executed by a module (of software modules 222) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computer system 202 normally processes information according to a program (a list of internally stored instructions such as a particular application program and/or an operating system) and produces resultant output information via input/output (I/O) devices 230. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The invention claimed is:

1. A merchant system for closing a patron's pre-authorized tab, with an associated payment token, set up with a computer device in communication with the merchant system, said system including one or more processors in communication with data storage, said processors being configured to execute computer readable instructions stored on said data storage for performing the steps of:
   opening the pre-authorized tab for the patron to order goods and/or services in person at a point of sale in response to receiving a user input from the patron;
   determining whether to close the pre-authorized tab based on detection of one or more closure criteria by the merchant system;
   wherein in response to determining to close the pre-authorized tab performing the steps of:
      determining a total amount spent on the goods and/or services ordered by the patron at the point of sale,
      sending the total amount spent and the payment token associated with the pre-authorized tab to an online service for authentication to enable payment to the merchant, and
      closing the pre-authorized tab.

2. The system claimed in claim 1, wherein the step of determining whether to close the pre-authorized tab based on the detection of the one or more closure criteria includes the step of determining whether the patron's computer device is within a virtual perimeter associated with the merchant system.

3. The system claimed in claim 2, wherein the step of determining whether to close the pre-authorized tab based on the detection of the one or more closure criteria is effected by testing whether the patron's computer device is still in communication with the merchant system.

4. The system claimed in claim 2, wherein the step of determining if the patron's computer device is within a virtual perimeter is effected by performing the steps of:
   (a) sending a request for location data to the patron's device;
   (b) receiving data representing the location of the patron's device from the patron's device; and
   (c) determining whether the location of the patron's device is located within said virtual perimeter.

5. The system claimed in claim 1, wherein the step of determining whether to close the pre-authorized tab based on the detection of the one or more closure criteria involves the step of determining whether a current time is within merchant defined operating hours.

6. The system claimed in claim 1, wherein the patron's pre-authorized tab includes a patron defined close tab time and said step of determining whether to close the pre-authorized tab based on the detection of the one or more closure criteria involves the step of determining whether the current time is less than the patron defined close tab time.

7. The system claimed in claim 1, wherein the patron's pre-authorized tab includes a patron defined amount of time that the tab is to remain open and said step of determining whether to close the pre-authorized tab based on the detection of the one or more closure criteria involves the step of determining whether that amount of time has not run out.

8. A non-transitory computer readable storage medium embodying thereon a program of computer readable instructions which, when executed by one or more processors of a patron's portable computer device in communication with a merchant system, cause the device to perform a method for closing a pre-authorized tab with an associated payment token, including the steps of:
   opening the pre-authorized tab for the patron to order goods and/or services in person at a point of sale in response to receiving a user input from the patron;
   determining whether to close the pre-authorized tab based on detection of one or more closure criteria;
   wherein in response to determining to close the pre-authorized tab performing the steps of:
      determining a total amount spent on the goods and/or services ordered by the patron at the point of sale,
      sending the total amount spent and the payment token associated with the pre-authorized tab to an online service for authentication to enable payment to the merchant, and
      closing the pre-authorized tab.

9. The storage medium claimed in claim 8, wherein the step of determining whether to close the pre-authorized tab based on the detection of the one or more closure criteria includes the step of determining whether the patron's computer device is within a virtual perimeter associated with the merchant system.

10. The storage medium claimed in claim 9, wherein the step of determining whether to close the pre-authorized tab based on the detection of the one or more closure criteria is effected by testing whether the patron's computer device is still in communication with the merchant system.

11. The storage medium in claim 9, wherein the step of determining whether the patron's computer device is within a virtual perimeter is effected by performing the steps of:
  (a) generating data representing a location of the patron's device; and
  (b) determining whether the location of the patron's device is within said virtual perimeter.

12. The storage medium claimed in claim 11, wherein the step of generating the data representing a location of the patron's device is performed using location services of the device.

13. The storage medium claimed in claim 12, wherein the location services include a global positioning system (GPS) receiver in communication with GPS satellites.

14. The storage medium claimed in claim 8, wherein the step of determining whether to close the pre-authorized tab based on the detection of the one or more closure criteria involves the step of determining whether a current time is within merchant defined operating hours.

15. The storage medium claimed in claim 8, wherein the patron's pre-authorized tab includes a patron defined close tab time and said step of whether to close the pre-authorized tab based on the detection of the one or more closure criteria involves the step of determining whether the current time is less than the patron defined close tab time.

16. The storage medium claimed in claim 8, wherein the patron's pre-authorized tab includes a patron defined amount of time that the tab is to remain open and said step of determining whether to close the pre-authorized tab based on the detection of the one or more closure criteria involves the step of determining if that amount of time has not run out.

* * * * *